UNITED STATES PATENT OFFICE.

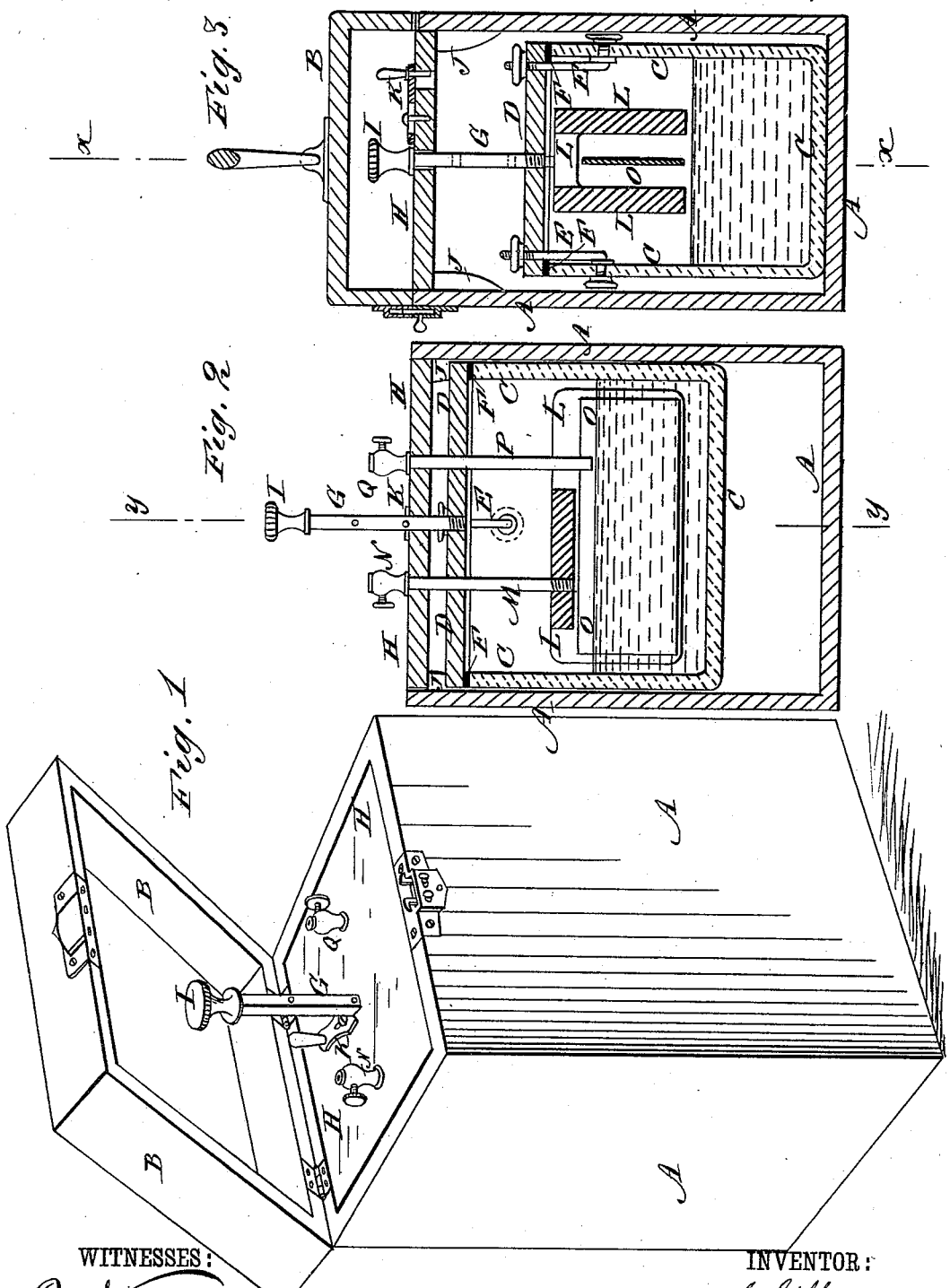

CHARLES GIBBS, OF NEW YORK, N. Y.

PORTABLE GALVANIC BATTERY.

SPECIFICATION forming part of Letters Patent No. 266,129, dated October 17, 1882.

Application filed July 26, 1882. (No model.)

*To all whom it may concern:*

Be it known that I, CHARLES GIBBS, of the city, county, and State of New York, have invented certain new and useful Improvements in Portable Galvanic Batteries, of which the following is a full, clear, and exact description.

Reference is to be had to the accompanying drawings, forming part of this specification, in which similar letters of reference indicate corresponding parts in all the figures.

Figure 1 is a perspective view of my improvement, shown with the cover partly raised. Fig. 2 is a sectional front elevation of the same, taken through the line $x\,x$, Fig. 3. Fig. 3 is a sectional side elevation of the same, taken through the line $y\,y$, Fig. 2.

The object of this invention is to facilitate the bringing of the electrodes and solution into contact and separating them, and also to prevent the solution from escaping when the machine is being carried.

The invention consists in a portable galvanic battery constructed with a case containing a jar provided with a water-tight cover firmly secured to it. Through a stationary cover connected with the case passes a rod attached to the cover of the jar for raising and lowering the jar, and which is secured in place, when adjusted, by a fastening attached to the stationary cover. The electrodes are placed in the jar, and are supported by rods attached to them, passing through the jar-cover and the stationary cover, and having binding-posts attached to their upper ends, whereby the electrodes and solution can be brought into contact and separated by raising and lowering the jar, as will be hereinafter fully described.

A represents the case of the battery, which may be a compartment of the case of a galvanic machine, and which may be provided with a cover, B.

C is a jar made of glass or other suitable material that will not be affected by the solution used. The jar C is provided with a cover, D, of hard rubber or other material that will not be affected by the solution, and which is fitted water-tight to the top of the jar C. The cover D is secured to the jar C by the rods E, the lower ends of which are bent outward, passed through holes in the sides of the jar C, and secured in place water-tight by nuts and washers or other suitable means. The upper ends of the rods E pass up through the cover D, and are secured in place water-tight by nuts and washers or other suitable means.

If desired, a packing, F, of soft rubber can be interposed between the edges of the jar C and the cover D, as shown in Figs. 2 and 3.

To the center of the cover D is attached the lower end of a rod, G, which passes up through the second cover, H, and has a knob, I, attached to its upper end, so that the jar C can be raised and lowered by means of the rod G. The cover H rests upon brackets or cleats J, attached to or upon shoulders or rabbets formed in the case A. Several holes or notches are formed in the rod G to receive a bolt, K, a button, or other fastening attached to the cover H, so that the rod G can be secured in place when holding the jar C fully raised or partly raised, as may be desired.

L is the positive electrode, to which is attached the lower end of a rod, M, which passes up through the covers D and H, and has a binding-post, N, attached to its upper end. The positive electrode L is grooved centrally and longitudinally to receive the negative electrode O, and the said groove is extended up at one end through the electrode L for the passage of the rod P, to the lower end of which the negative electrode O is attached. The rod P passes up through the covers D and H, and has a binding-post, Q, attached to its upper end. The rods M P or the binding-posts N Q are attached to the cover H, so that the electrodes L O will be permanently supported at the same distance from the said cover H. With this construction the electrodes L O will be brought into contact with the solution placed in the jar C by raising the said jar, as illustrated in Fig. 2, and will be separated from the said solution by lowering the said jar C, as illustrated in Fig. 3.

I am aware that it is not broadly new to use rubber or other elastic material as a cover for the jar, in order to prevent the solution from escaping when the machine is being transported from one place to another; but What I do claim is—

1. The combination, with the jar C and cover

D, of the rods E, bent outward at the lower end, passed through holes in the sides of the jar as well as through the cover, and secured by nuts, as shown and described.

2. A portable galvanic battery constructed, substantially as herein shown and described, with a case, A, a jar, C, provided with a water-tight cover, D, the stationary cover H, supported from the case A, the jar-adjusting rod G, the electrodes L O and their rods M P, and binding-posts N Q, as set forth.

3. In a portable galvanic battery, the combination, with the case A, the jar C, having a closely-fitting cover, D, firmly secured to it, and the electrodes L O, of the stationary cover H, the sliding rod G, attached to the jar-cover D and its fastening K, and the stationary rods M P, attached to the electrodes and their binding-posts N Q, substantially as herein shown and described, whereby the electrodes and the solution can be readily brought into contact and separated, as set forth.

CHARLES GIBBS.

Witnesses:
JAMES T. GRAHAM,
C. SEDGWICK.